April 13, 1937.  N. F. FRETTER  2,076,715
SEALING MEANS
Filed July 27, 1934  3 Sheets-Sheet 1
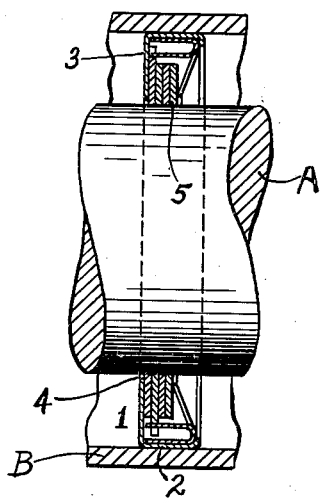
Fig. 1
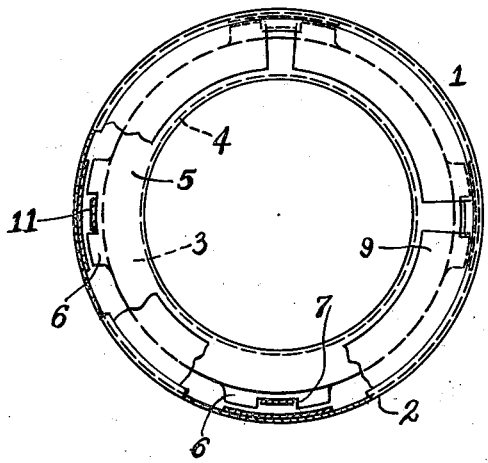
Fig. 2
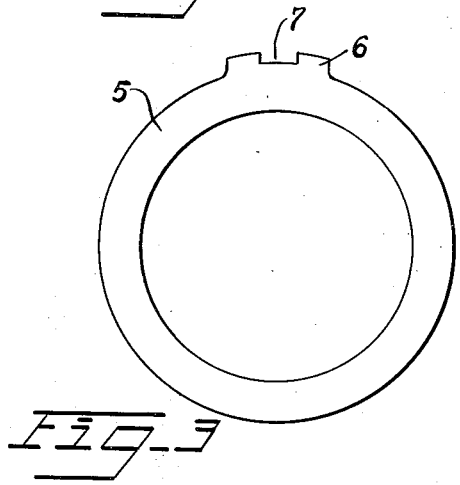
Fig. 3
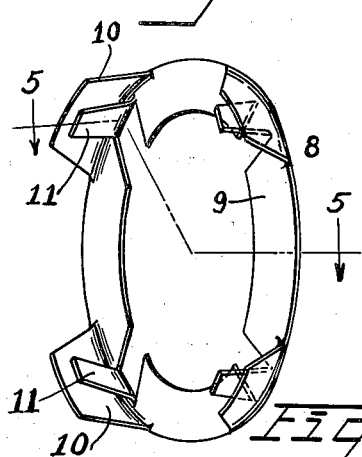
Fig. 4
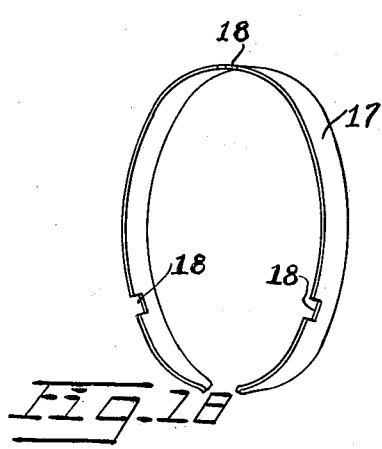
Fig. 1a
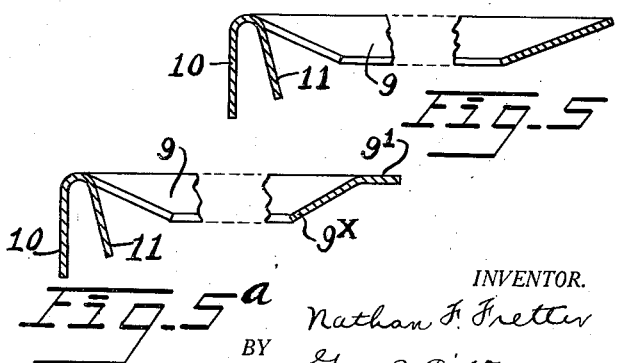
Fig. 5
Fig. 5a
INVENTOR.
Nathan F. Fretter
BY
Geo. B. Pitts
ATTORNEY.

April 13, 1937. N. F. FRETTER 2,076,715
SEALING MEANS
Filed July 27, 1934 3 Sheets-Sheet 2
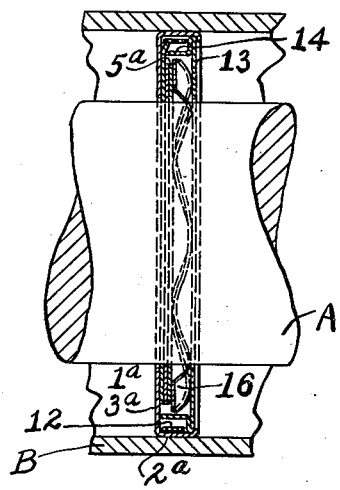
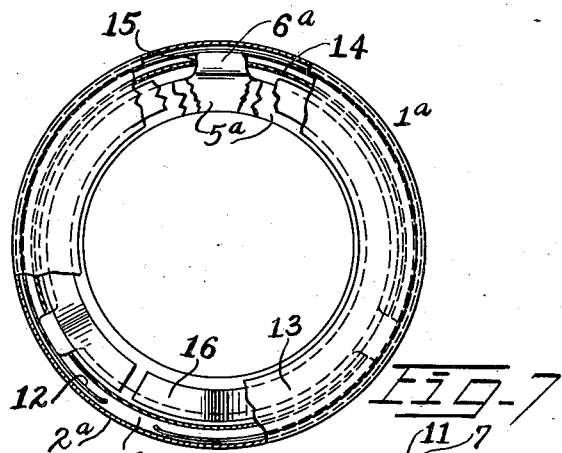
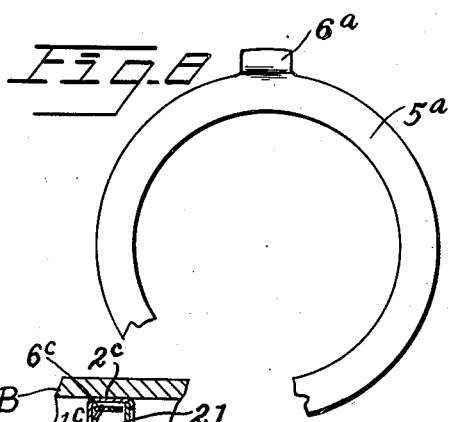
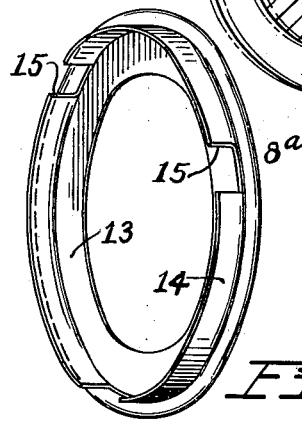
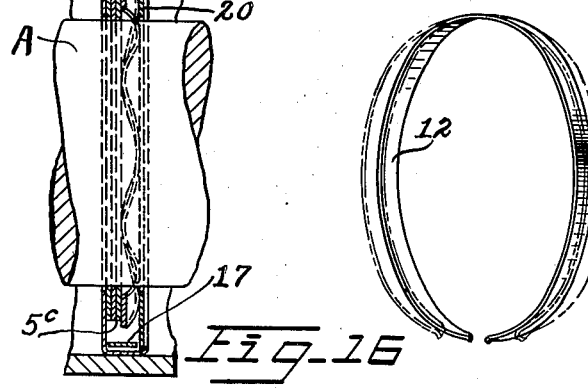
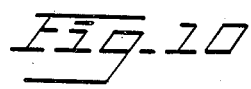
INVENTOR.
Nathan F. Fretter
Geo. B. Pitts
BY
ATTORNEY.

April 13, 1937.  N. F. FRETTER  2,076,715
SEALING MEANS
Filed July 27, 1934   3 Sheets-Sheet 3

INVENTOR.
Nathan F. Fretter
BY
Geo B Pitts
ATTORNEY.

Patented Apr. 13, 1937

2,076,715

UNITED STATES PATENT OFFICE 2,076,715

SEALING MEANS

Nathan F. Fretter, Cleveland Heights, Ohio

Application July 27, 1934, Serial No. 737,283

13 Claims. (Cl. 286—30)

This invention relates to a sealing means for inner and outer members capable of relative movement rotatively or endwise for the purpose of interrupting the flow of material through the outer member. The invention is shown in connection with a hollow member enclosing a movable device, for example, a rotatable shaft as illustrating the preferred application of the invention.

One object of this invention is to provide such a means which shall be very simple in construction, enabling its economical manufacture, readily assembled, and at the same time shall be effective and durable in service.

Another object of the invention is to provide between a hollow member and a movable device an improved sealing means having a plurality of related sealing elements arranged to insure an effective seal between said member and device.

A further object of the invention is to provide between a hollow member and a movable device an improved sealing means comprising flat annular sealing members capable of being normally independently biased for relative bodily movement transversely of the device, whereby the sealing members compensate for wear and are free to accommodate themselves to any eccentricity of the device while providing an effective seal therefor.

Other objects of the invention will be apparent to those skilled in the art to which my invention relates from the following description taken in connection with the accompanying drawings, wherein Fig. 1 is a fragmentary longitudinal section through a hollow member and my sealing means, the shaft being shown in elevation.

Fig. 2 is an end view of the sealing means shown in Fig. 1, parts being broken away.

Fig. 2a is a plan view of one of the sealing members of Fig. 2 positioned on a shaft.

Fig. 3 is a plan view of a sealing member.

Fig. 4 is a perspective view of the enclosure member.

Fig. 5 is a section on the line 5—5 of Fig. 4.

Fig. 5a is a section similar to Fig. 5, but showing a modified form of construction.

Fig. 6 is a view similar to Fig. 1, but showing a different embodiment of the invention.

Fig. 7 is a plan view of sealing means shown in Fig. 6, with parts broken away.

Fig. 8 is a plan view of one of the sealing members shown in Fig. 6.

Figs. 9 and 10 are detail views, in perspective, of parts shown in Fig. 6.

Fig. 16 is a view similar to Fig. 1, but showing a further embodiment of the invention.

Fig. 18 is a perspective view of one of the springs shown in Fig. 16.

Figure 11:
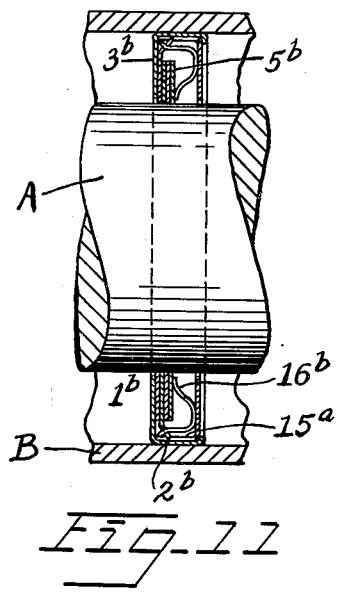
Fig. 11 is a view similar to Fig. 1, but showing another embodiment of the invention.
Figure 12:
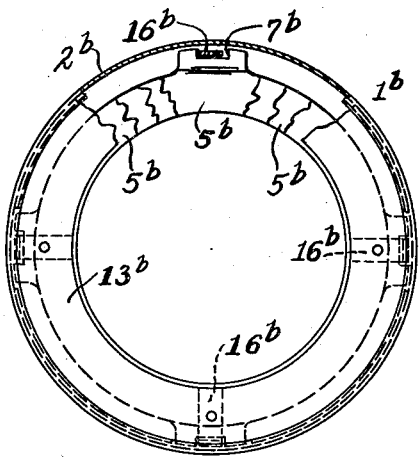
Fig. 12 is a plan view of the sealing means shown in Fig. 11, with parts broken away.
Figure 13:
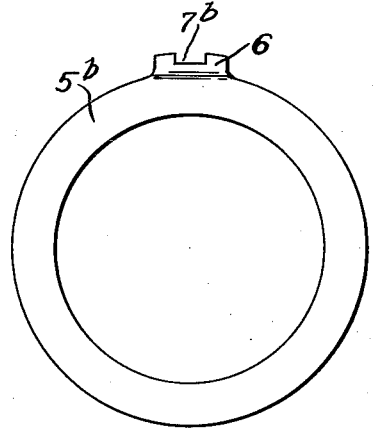
Fig. 13 is a plan view of one of the sealing members shown in Fig. 11.

In Fig. 1, A indicates a movable device shown herein as a shaft for illustrative purposes. B is a hollow member or tubular housing concentric therewith. Such device and housing may be used in a variety of installations. Thus I may mention for instance, the rear axle construction of an automobile, where my sealing means occupying the annular space between the shaft and the housing and coacting with both of them, prevents the passage of grease or oil along the space between them. In other classes of machinery, the sealing means may be used to prevent the passage of dirt, grit, liquids or gases, according to the nature of the material within the tubular member or housing.

Referring to Figs. 1 to 5, inclusive, 1 indicates a cage formed of a sheet metal stamping and comprising a cylindrical or side wall 2 having a radial flange 3 forming a central opening 4 somewhat larger than the shaft A. The flange 3 forms a supporting wall against which a plurality of sealing members 5 are biased axially of the shaft A, as later set forth. The exterior surface of the wall 2 snugly fits the inner wall of the housing B to hold it in position and to prevent leakage of any material between these parts. In the embodiment being described, I prefer to employ four sealing members 5. Each sealing member comprises a relatively thin, hat annulus having at one side a lateral member 6 formed with an inwardly extending recess 7, to which reference will later be made. Each sealing member 5 is formed of any suitable metallic bearing material or alloy or materials that are relatively soft, including metal having a lead or zinc base, or fiber, leather or cork. As the sealing members are of flat formation, they may be readily stamped from the desired material ready for assembly.

8 indicates as an entirety a combined enclosure and biasing device. In the embodiment shown (Figs. 1, 2, 4 and 5), the device 8 is formed of relatively thin resilient metal, such as brass and is of annular shape. The device 8 comprises a circular wall 9 inclined inwardly and uniformly spaced, arc-shaped side walls 10 arranged to telescopically fit the wall 2 to support the device 8 in the cage 1, the free edge of the wall 2 being peened over the peripheral edge of the wall 9 to hold or retain the device 8 within the cage 1. The inner periphery of the wall 9 yieldingly engages the sealing members 5 to normally bias them axially of the shaft A toward the wall 3, whereby the sealing members are maintained in face to face relation but permits them to relatively move in a direction at right angles to the shaft 8, as later set forth. It will be obvious that the telescoping walls 10 may extend continuously around the wall 9. 11 indicates resilient fingers, one for each sealing member, carried by the wall 9 and extending inwardly, that is, toward the wall 3. By preference, the fingers 11 are struck up from the wall 9 by slitting the latter from its inner periphery outwardly on substantially parallel lines, but which may be slightly tapered to facilitate assembly of the sealing members 5. In assembly, each finger 11 extends through the recess 7 of one of the sealing members 5 and engages the bottom wall of the recess to normally bias the sealing member laterally, that is, at right angles to the axis of the shaft A. The number of resilient fingers 11 and sealing members may be increased or decreased or two or more sealing members may be associated so as to be acted on by each finger, if desired. The fingers 11 are of less width than that of the recess 7 to permit the sealing members to freely accommodate themselves to any eccentricity of the shaft A during rotation thereof but prevent rotation of the sealing members with the shaft. In this arrangement, it will be seen that portions of the inner peripheries of the sealing members are normally biased toward and maintained in engagement with the shaft A throughout its circumference and co-operate to effectively seal the space between the shaft A and member B. The sealing members are of a size to sealingly fit the shaft A, but as they are normally biased laterally any resulting wear on their inner peripheries will be compensated for without affecting their sealing effect. Where the telescoping walls 10 are spaced, as shown, the fingers 11 are struck up from adjacent portions of the wall 9 so that the walls 10 may reinforce the wall 9 adjacent the fingers 11.

If desired, the wall 9 may be shaped to form an outer annular portion 9', parallel to the wall 3, and an inner inclined portion 9x for engagement with the sealing members as shown in Fig. 5a.

Referring to Figs. 6 to 10, inclusive, 1a indicates the cage which is similar in construction to the cage already referred to. 5a indicates the sealing members, each provided at one side with a projection 6a. The sealing members 5a may be formed of suitable material as already set forth. 12 indicates a spring, preferably formed of flat resilient metal, of substantially circular shape and fitting within the cage 1a and engaging the projections 6a. The spring 12, when expanded as shown, is of a length to extend substantially entirely around the cage 1a (Fig. 10) and normally tends to move or slide the sealing members laterally, that is, at right angles to the axis of the shaft A. 8a indicates as an entirety an enclosure member of annular shape and formed of sheet metal. The metal is suitably formed to form an outer closing wall 13, the periphery of which fits within the cylindrical wall 2a of the cage and co-operates with the wall 3a to form a chamber for the spring 12, and a side wall 14, spaced inwardly of the periphery of the wall 13 and concentric thereto to provide a space for the spring 12. The side wall 14 is formed with uniformly spaced openings 15, being preferably slotted inwardly from its free edge to permit the projections 6a to extend radially beyond the wall 14 for engagement by the spring 12, the sealing members being arranged so that the projection on each thereof extends through one of the openings 15. As will be understood, the projections 6a, through their engagement with the sides of the openings 15, are prevented from rotating with the shaft A. Where a single spring 12 is utilized to operate on the sealing members 5a I prefer to provide three openings 15 and so that the spring 12 may act on the sealing members at three uniformly spaced points about the axes thereof. 16 indicates spring means disposed between the wall 13 and sealing members 5a and normally tending to bias the latter axially of the shaft A toward the wall 3a of the cage. The spring means 16 is illustrated as comprising a flat annulus (which may be a split member as shown) formed of resilient metal corrugated transversely or radially with the crowns of the corrugations engaging the wall 13 and adjacent sealing member 5a. As shown, the spring 16 surrounds the shaft A within the side wall 14 which maintains it in operative position. As shown, the outer free edge of the wall 2a is peened over the periphery of the wall 13 to secure the enclosure member 8a within the cage 1a.

Figure 14:
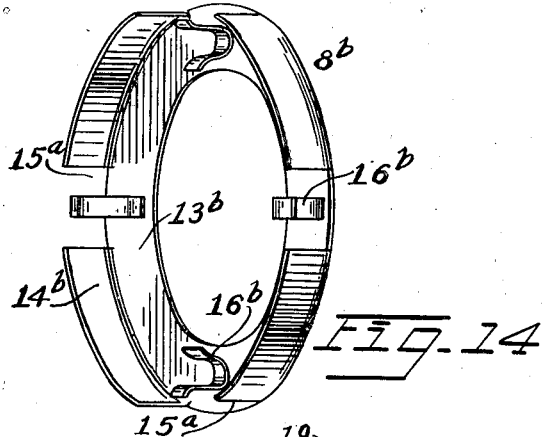
Fig. 14 is a perspective view of the enclosure member shown in Figs. 11 and 12.
Figure 15:
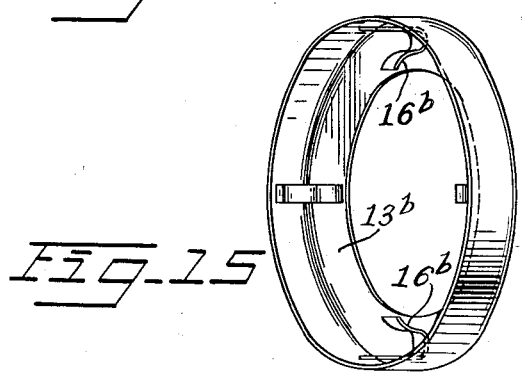
Fig. 15 is a view showing a modified form of construction.

Referring to Figs. 11 to 15, inclusive, 1b indicates the cage which is similar in construction to the cage 1 or 1a already referred to. 5b indicates the sealing members which are preferably similar in construction to the members shown in Figs. 1, 2 and 3 and formed of the desired material as already set forth. 8b indicates the enclosure member formed of thin sheet metal and comprising a circular wall 13b and a side wall 14b arranged to telescopically fit the wall 2b of the cage 1b, the free edge of the wall 2b being peened over the periphery of the wall 13b to hold the member 8b in the cage. The side wall 14b of the member 8b may be continuous, as shown in Fig. 15, or slotted at 15a, as shown in Figs. 11 and 14, to permit of longer diametrical movement of the sealing members. 16b indicates pairs of resilient devices or fingers carried by the wall 13b and uniformly spaced around its axis. Each pair of devices is formed of a section of flat resilient metal of substantially U-shape, having its base portion suitably secured (for example, spot welded) to the inner face of the wall 13b. The inner device of each pair yieldingly engages the adjacent sealing member and normally tends to move them axially of the shaft A, that is, toward the wall 3b of the cage 1b and the outer device of each pair extends through the recess 7b of one of the sealing members 5b and yieldingly engages the bottom of the recess to normally press the sealing member laterally, that is, in a direction at right angles to the axis of the shaft A.

Through engagement of the side walls of the recesses 7b with the inner resilient devices 16b, the sealing members 5b will be held against rotation with the shaft A.

Figure 17:
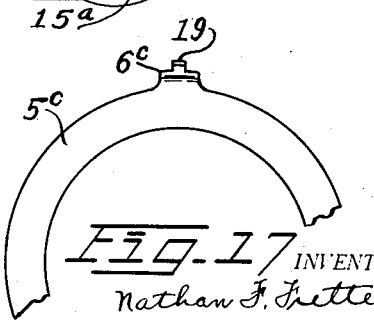
Fig. 17 is a plan view of a portion of a sealing member shown in Fig. 16.

Referring to Figs. 16, 17 and 18 I show another embodiment of the invention. In this embodiment I employ a cage 1c similar to the cages already referred to and sealing members 5c each having a projection 6c at one side and arranged to be engaged by a spring 17 (preferably similar to the spring 12—Fig. 10) mounted substantially concentric to and within but spaced from the wall 2c, so as to be free to operate and rotate in the cage 1c as will later appear. The spring 17 and sealing members 5c are interlocked together, for example, the spring 17 is formed with a plurality of notches 18 and each projection 6c is provided with an ear 19 which fits into one of the notches to effect the interlock, and to maintain the sealing members in their relative angular relation, that is, with their projections uniformly spaced about the axis of the shaft A. 20 indicates a circular wall loosely fitting the cylindrical or side wall 2c of the cage and held in position by the peened over edge of the wall 2c. 21 indicates a spring means between the wall 20 and sealing members 5c. The spring shown is preferably similar in construction to the spring 16 (Figs. 6 and 7). The spring 17 serves to move the sealing members 5c diametrically of the shaft A and the spring 21 serves to move them axially of the shaft. It will be noted that in the embodiment shown in Figs. 16, 17 and 18, I do not provide an interlock between the sealing members and the enclosure members; accordingly the sealing members 5c, due to their frictional engagement with the shaft, are free to move with the latter, but as the sealing members are yieldingly pressed against the wall 3c, a sealing is effected to prevent flow of material (oil, grease, etc.) through the member B. As the sealing members 5c are interlocked with the spring 17, it moves with them; also, as the wall 20 loosely fits the wall 2c, it and the spring 21 are free to rotate with the sealing members.

From the foregoing description it will be noted that I provide sealing members of flat material which permits of ready manufacture thereof from various suitable materials, also that such members, when assembled, are positioned in side-by-side or face-to-face relation, are yieldingly maintained therein and provide a relatively wide effective sealing surface around their inner peripheries. By this arrangement the width of the sealing surface may be readily increased or decreased to meet varying conditions. As the sealing members are yieldingly pressed laterally and yieldingly pressed axially of the shaft, their effective relation to the shaft, cage walls and each other is readily maintained. This form of construction provides for a seal between the sealing members and the supporting wall of the cage. It will also be noted that the sealing members are relatively movable diametrically of the shaft or at right angles to its axis and actuated under spring tension, such tension being effected on the respective sealing members at different angular positions about the axis of the shaft A, so that the inner edges of the sealing members are yieldingly pressed against all portions of the shaft throughout its circumference. Although the sealing members are of a size to closely fit the shaft A, by providing for the diametrical movement thereof under spring pressure, wear of the sealing members is compensated for (where these members do not rotate with the shaft) while constantly maintaining a sealing effect between the members and the shaft. The resiliency of the devices or means for moving the sealing members axially is relatively light to permit free movement of the sealing members diametrically of the shaft and the resiliency of the devices or means for moving the sealing members in the latter direction is also relatively light to prevent undue wear.

It will also be noted that each sealing member is not only movable diametrically of the shaft A relative to the remaining sealing members, but it is also free to float in its plane relative to the other members due to any eccentricity of the shaft or disalignment of its axis. When the sealing members are relatively moved for these causes, they swing about their contacting edges with those edges of adjacent parts which maintain them in spaced angular relation.

To those skilled in the art to which my invention relates, many changes in construction and widely differing embodiments and applications of the invention will suggest themselves without departing from the spirit and scope of the invention. My disclosures and the description herein are purely illustrative and not intended to be in any sense limiting.

What I claim is:

1. A unitary sealing means adapted to be associated with a shaft within a hollow member, comprising a sheet metal cup shaped cage having a pressed-on fit with the inner wall of the hollow member, a plurality of relatively thin metallic sealing disks within said cage and surrounding and fitting the shaft, resilient means tending to move said disks axially of the shaft in one direction, and resilient means tending independently to move said disks along angularly disposed diametrical lines, one of said means operating to prevent relative rotation of said disks about their axes.

2. A unitary sealing means adapted to be associated with a shaft, comprising a sheet metal cup-shaped cage, a plurality of flat, relatively movable sealing members within said cage and fitting the shaft and disposed in face to face relation, and unitary means supported by the side wall of said cage and engaging said sealing members at different angular positions, respectively, tending independently to move said members diametrically of the shaft and to move said members axially of the shaft in one direction.

3. A unitary sealing means adapted to be associated with a shaft within a hollow member, comprising a sheet metal cup shaped cage fitting within said hollow member, a plurality of sealing members within said cage and fitting said shaft, and a device carried by the side wall of said cage and provided with means normally tending to move said sealing members axially of the shaft in one direction and also means normally tending independently to move each of said sealing members along angularly disposed lines diametrically of said shaft.

4. A unitary sealing means adapted to be associated with a shaft within a hollow member, comprising a sheet metal substantially cup-shaped cage fitting the hollow member, a closure device for said cage, and a plurality of sealing members between said device and the bottom wall of said cage and fitting the shaft, said device being provided with resilient elements tending to move said sealing members axially of the shaft in one direction and resilient elements tending independently to move said sealing members in directions diametrically of the shaft, certain of said elements serving to prevent rotation of said sealing members.

5. A sealing means adapted to be associated with a shaft within a hollow member, comprising a cup shaped cage formed of resilient sheet metal permitting its side wall to accommodate itself to the interior wall of said member to form a substantially liquid tight fit therewith, a plurality of sealing members fitting the shaft within said cage, and unitary means for independently moving said sealing members in directions diametrically of the shaft and interlocked to said members for preventing rotation of said members relative to each other and about the axis of said shaft.

6. A sealing means adapted to be associated with a shaft within a hollow device, comprising a cage member formed of resilient sheet metal having a supporting wall and an annular side wall adapted to accommodate itself to the interior wall of said hollow device to form a substantially liquid tight fit therewith, a closure member supported by said side wall, a plurality of sealing members fitting the shaft between said closure member and said supporting wall, and means carried by one of said members for independently moving said sealing members in directions diametrically of the shaft and preventing rotation of said members about the axis of said shaft, and means carried by one of said members normally tending to move said sealing members toward said supporting wall.

7. A sealing means adapted to be associated with a shaft within a hollow member, comprising a sheet metal cage having a supporting wall and a side wall fitting the hollow member, a plurality of annular sealing disks within said cage and fitting the shaft, and a closure device carried by said side wall of the cage and having an inner portion carrying spaced resilient devices engaging said sealing disks for independently moving them in directions diametrically of the shaft and intermediate portions yieldingly engaging said sealing disks and tending to move them toward said supporting wall.

8. A sealing means adapted to be associated with a shaft within a hollow member, comprising a cage, a plurality of sealing members fitting the shaft within said cage, a spring within the cage and engaging the respective sealing members at different angular positions about their circumferences, a closure member for said cage having portions interlocked to said sealing members, respectively, to prevent rotation thereof, and spring means between said closure member and said sealing members tending to move them in one direction axially of the shaft.

9. A sealing means adapted to be associated with a shaft within a hollow member, comprising a sheet metal cage having a supporting wall and a side wall fitting the hollow member, a plurality of annular sealing disks within said cage and fitting said shaft, a closure device having outer portions telescopically fitting said side wall and resilient inner portions engaging said disks and normally tending to move said disk toward said supporting wall, and means carried by said inner portions normally tending independently to move said sealing disks in directions diametrically of the shaft and preventing rotation of said disks about the axis of said shaft.

10. A unitary sealing means adapted to be associated with a shaft within a hollow member, comprising a sheet metal cup shaped cage fitting within said hollow member, a plurality of annular sealing disks within said cage and fitting said shaft, and an annular device consisting of an outer portion supported by the side wall of said cage and an inner resilient portion having spaced sections engaging with and normally tending to move said sealing disks axially of the shaft in one direction and intermediate sections normally tending independently to move said sealing disks along angularly disposed lines diametrically of said shaft.

11. An article of manufacture for a shaft sealing means formed of resilient sheet metal and comprising an annular device having lateral side elements adapted to fit within the side walls of a cup shaped member, a set of spaced elements arranged to bias packing means within the member diametrically of the shaft and separate elements between said spaced elements arranged to bias the packing means axially of the shaft.

12. A sealing means adapted to be associated with a shaft within a hollow member, comprising a sheet metal substantially cup-shaped cage, a plurality of annular sealing disks within the cage and fitting the shaft and provided respectively with projections disposed in angular relation about their axes, a closure device provided with an inwardly extending side wall formed with openings to receive said projections to prevent rotation of said disks, resilient means engaging said projections and tending independently to move said disks diametrically of the shaft, and a spring between said device and said disks tending to move them in one direction axially of the shaft.

13. A sealing means adapted to be associated with a shaft within a hollow member, comprising a sheet metal substantially cup-shaped cage having a pressed-on fit with the inner wall of the hollow member, a plurality of annular disks within said cage and provided respectively with projections disposed angularly about their axes, a flat annular spring within said cage normally engaging said disks and tending independently to move them diametrically of the shaft, said spring being formed with openings to receive said projections to prevent rotation of the disks in relation to each other, an annular device for closing the outer end of said cage, and a spring between said device and said disks tending to move the latter axially of the shaft.

NATHAN F. FRETTER.